(12) United States Patent
Bello et al.

(10) Patent No.: US 11,983,600 B2
(45) Date of Patent: May 14, 2024

(54) COMPILATION OF A QUANTUM PROGRAM

(71) Applicant: International Business Machines Corporation, Armonk, NY (US)

(72) Inventors: Luciano Bello, New York, NY (US); Ali Javadiabhari, Sleepy Hollow, NY (US); Ji Liu, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 781 days.

(21) Appl. No.: 17/121,189

(22) Filed: Dec. 14, 2020

(65) Prior Publication Data

US 2022/0188681 A1 Jun. 16, 2022

(51) Int. Cl.
| | |
|---|---|
| G06N 10/00 | (2022.01) |
| G06F 8/41 | (2018.01) |
| G06F 18/20 | (2023.01) |
| G06F 18/21 | (2023.01) |
| G06F 18/211 | (2023.01) |

(52) U.S. Cl.
CPC .............. G06N 10/00 (2019.01); G06F 8/49 (2013.01); G06F 18/211 (2023.01); G06F 18/217 (2023.01); G06F 18/29 (2023.01)

(58) Field of Classification Search
CPC ........ G06N 10/00; G06N 5/022; G06N 10/20; G06N 10/80; G06F 8/49; G06F 18/211; G06F 18/217; G06F 18/29; G06F 8/41
See application file for complete search history.

(56) References Cited

U.S. PATENT DOCUMENTS

| | | | |
|---|---|---|---|
| 8,046,206 B1 * | 10/2011 | Hood, III | ............... G06F 30/30 703/13 |
| 8,635,415 B2 | 1/2014 | Patel et al. | |
| 10,162,694 B2 | 12/2018 | Stark et al. | |
| (Continued) | | | |

OTHER PUBLICATIONS

Graph comparison via nonlinear quantum search. Chiew et al. pp. 1-25. (Year: 2018).*

(Continued)

*Primary Examiner* — Hien L Duong
(74) *Attorney, Agent, or Firm* — Amin, Turocy & Watson, LLP

(57) ABSTRACT

Embodiments are provided for compilation of a quantum program. In some embodiments, a system can include a processor that executes computer-executable components stored in memory. The computer-executable components can include an identification component that selects a subgraph that is common among a first commutation directed acyclic graph (DAG) and a second commutation DAG. The subgraph has an upper-bound size that is greater than a threshold size. The first commutation DAG represents a first quantum circuit of a set of quantum circuits and the second commutation DAG represents a second quantum circuit of the set of quantum circuits. The computer-executable components also include a compilation component that compiles a quantum subcircuit corresponding to the subgraph. The computer-executable components further include a configuration component that replaces the quantum subcircuit in the first quantum circuit with the compiled quantum subcircuit.

20 Claims, 11 Drawing Sheets

(56) References Cited

U.S. PATENT DOCUMENTS

| | | | | |
|---|---|---|---|---|
| 10,769,545 | B2* | 9/2020 | Amin | G06N 10/00 |
| 10,929,294 | B2* | 2/2021 | Brahm | G06F 16/9038 |
| 11,144,689 | B1* | 10/2021 | Cowtan | G06F 30/327 |
| 2014/0324864 | A1* | 10/2014 | Choe | G06F 16/73 |
| | | | | 707/737 |
| 2016/0055421 | A1* | 2/2016 | Adachi | G06N 5/01 |
| | | | | 706/46 |
| 2018/0039903 | A1 | 2/2018 | Mosca et al. | |
| 2018/0095720 | A1 | 4/2018 | Gopal et al. | |
| 2018/0181685 | A1 | 6/2018 | Roetteler et al. | |
| 2018/0276556 | A1* | 9/2018 | Garrison | G06N 5/01 |
| 2018/0276994 | A1* | 9/2018 | Dukatz | G08G 5/0021 |
| 2019/0121921 | A1* | 4/2019 | Nam | G06F 30/327 |
| 2019/0333242 | A1* | 10/2019 | Chen | G06V 20/653 |
| 2020/0125985 | A1 | 4/2020 | Narang et al. | |
| 2020/0184024 | A1* | 6/2020 | Nam | G06F 30/327 |
| 2020/0218848 | A1 | 7/2020 | Martiel et al. | |
| 2020/0242295 | A1* | 7/2020 | Martiel | G06N 10/00 |
| 2020/0272926 | A1* | 8/2020 | Chaplin | G06F 9/3885 |
| 2020/0334563 | A1* | 10/2020 | Gambetta | B82Y 10/00 |
| 2020/0380084 | A1* | 12/2020 | Gambetta | G06N 10/00 |
| 2020/0387822 | A1* | 12/2020 | Kilmov | G06N 10/00 |
| 2021/0064350 | A1* | 3/2021 | Cao | G06N 10/00 |
| 2022/0101169 | A1* | 3/2022 | Nam | G06N 10/20 |
| 2022/0114313 | A1* | 4/2022 | Zhang | G06F 30/30 |

OTHER PUBLICATIONS

Margin: Maximal Frequent subgraph mining. Thomas et al. pp. 1-5. (Year: 2006).*

Iten et al., "Exact and practical pattern matching for quantum circuit optimization," arXiv:1909.05270v2 [quant-ph] Jul. 29, 2020, 43 pages.

"Add DAGDependency #3581," RMOYARD; Qiskit/qiskit-terra; https://github.com/Qiskit/qiskit-terra/pull/3581; 11 pages.

Cordella et al., "A (Sub)Graph Isomorphism Algorithm for Matching Large Graphs," IEEE Transactions on Pattern Analysis and Machine Intelligence; Oct. 2004, vol. 26, No. 10, 6 pages.

Houbraken et al., "The Index-Based Subgraph Matching Algorithm with General Symmetries (ISMAGS): Exploiting Symmetry for Faster Subgraph Enumeration," PLOS ONE; May 2014, vol. 9, Issue 5, e97896, 15 pages.

Englert et al., "Efficient Heuristics for Maximum Common Substructure Search," J. Chem. Inf. Model., Apr. 11, 2015, 55, 5, 15 pages.

Raymond et al., "RASCAL: Calculation of Graph Similarity using Maximum Common Edge Subgraphs, " Mar. 2002 The Computer Journal 45(6), 14 pages.

Akritidis et al., "Baggy Bounds Checking: An Efficient and Backwards-Compatible Defense against Out-of-Bounds Errors," 1SSYM'09: Proceedings of the 18th conference on USENIX security symposium, Aug. 2009, 50 pages.

Brunink et al., "Boundless Memory Allocations for Memory Safety and High Availability," 2011 IEEE/IFIP 41st International Conference on Dependable Systems & Networks (DSN), Hong Kong, Jun. 27-30, 2011, 12 pages.

Devietti et al., "HardBound: Architectural Support for Spatial Safety of the C Programming Language," ACM SIGARCH Computer Architecture News, Mar. 2008, 12 pages.

Quer et al., "The Maximum Common Subgraph Problem: A Parallel and Multi-Engine Approach," Computation 2020, 8(2), 48, 29 pages.

McCreesh et al., "A Partitioning Algorithm for Maximum Common Subgraph Problems," Proceedings of the Twenty-Sixth International Joint Conference on Artificial Intelligence (IJCAI-17), 8 pages.

Mell et al., "The NIST Definition of Cloud Computing," Recommendations of the National Institute of Standards and Technology, NIST Special Publication 800-145, Sep. 2011, 7 pages.

Iten, et al. "Efficient template matching in quantum circuits" arXiv:1909.05270v1 [quant-ph], Sep. 11, 2019, 26 Pages.

* cited by examiner

```
1  eub = {pair -> integer} //eub: map from a circuit pair to an estimated upper-bound
2  for (pair in GxG) { //G: a set of commutation DAGs in a same basis
3      eub[pair] = EUB(pair₁, pair₂) } //EUB returns estimated upper-bound of the common subgraphs
4  sorted_eub = sort(eub) //sort the circuit pairs in decreasing order
5
6  for (pair in sorted_eub) {
7      if (sorted_eub[pair] > kappa₀) { //kappa₀: lower bound
8          sorted_eub -= pair //removes the pair from the sorted_eub set
9          csg = CSG(pair₁, pair₂) //CSG returns maximum common subgraph (MCS)
10         optimized_csg = optimize(csg) //optimize: compiles the common quantum subcircuit
11         replace(pair₁, csg, optimized_csg) // replaces the compiled quantum subcircuit
12         replace(pair₂, csg, optimized_csg) // in the original quantum circuit
13     } else {
14         break
15     }
16 }
```

FIG. 5

COMPILATION OF A QUANTUM PROGRAM

BACKGROUND

The subject disclosure relates to compilation of a quantum program, including identification of quantum subcircuits within the quantum program.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system is provided. The system includes a processor that executes computer-executable components stored in memory. The computer-executable components include an identification component that selects a subgraph that is common among a first commutation directed acyclic graph (DAG) and a second commutation DAG. The subgraph has an upper-bound size that is greater than a threshold size. The first commutation DAG represents a first quantum circuit of a set of quantum circuits and the second commutation DAG represents a second quantum circuit of the set of quantum circuits. The computer-executable components also include a compilation component that compiles a quantum subcircuit corresponding to the subgraph. The computer-executable components further include a configuration component that replaces the quantum subcircuit in the first quantum circuit with the compiled quantum subcircuit.

According to another embodiment, a computer-implemented method is provided. The computer-implemented method includes selecting, by a compiler system operatively coupled to a processor, a subgraph that is common among a first commutation directed acyclic graph (DAG) and a second commutation DAG. The subgraph has an upper-bound size that is greater than a threshold size. A first commutation DAG represents a first quantum circuit of a set of quantum circuits and the second commutation DAG represents a second quantum circuit of the set of quantum circuits. The computer-implemented method includes compiling, by the compiler system, a quantum subcircuit corresponding to the subgraph. The computer-implemented method further includes replacing, by the compiler system, the quantum subcircuit in the first quantum circuit with the compiled quantum subcircuit.

According to a further embodiment, a computer program product for compilation of a quantum program. The computer program product includes a computer-readable storage medium having program instructions embodied therewith. The program instructions are executable by a processor to cause the processor to select a subgraph that is common among a first commutation directed acyclic graph (DAG) and a second commutation DAG. The subgraph has an upper-bound size that is greater than a threshold size. The first commutation DAG represents a first quantum circuit of a set of quantum circuits and the second commutation DAG represents a second quantum circuit of the set of quantum circuits. The program instructions also are executable by the processor to cause the processor to compile a quantum subcircuit corresponding to the subgraph. The program instructions are further executable by the processor to cause the processor to replace the quantum subcircuit in the first quantum circuit with the compiled quantum subcircuit.

BRIEF DESCRIPTION OF THE DRAWINGS

FIG. 5 illustrates a non-limiting example of pseudocode for an example technique to compile a quantum program, in accordance with one or more embodiments of this disclosure.

DETAILED DESCRIPTION

Figure 1:
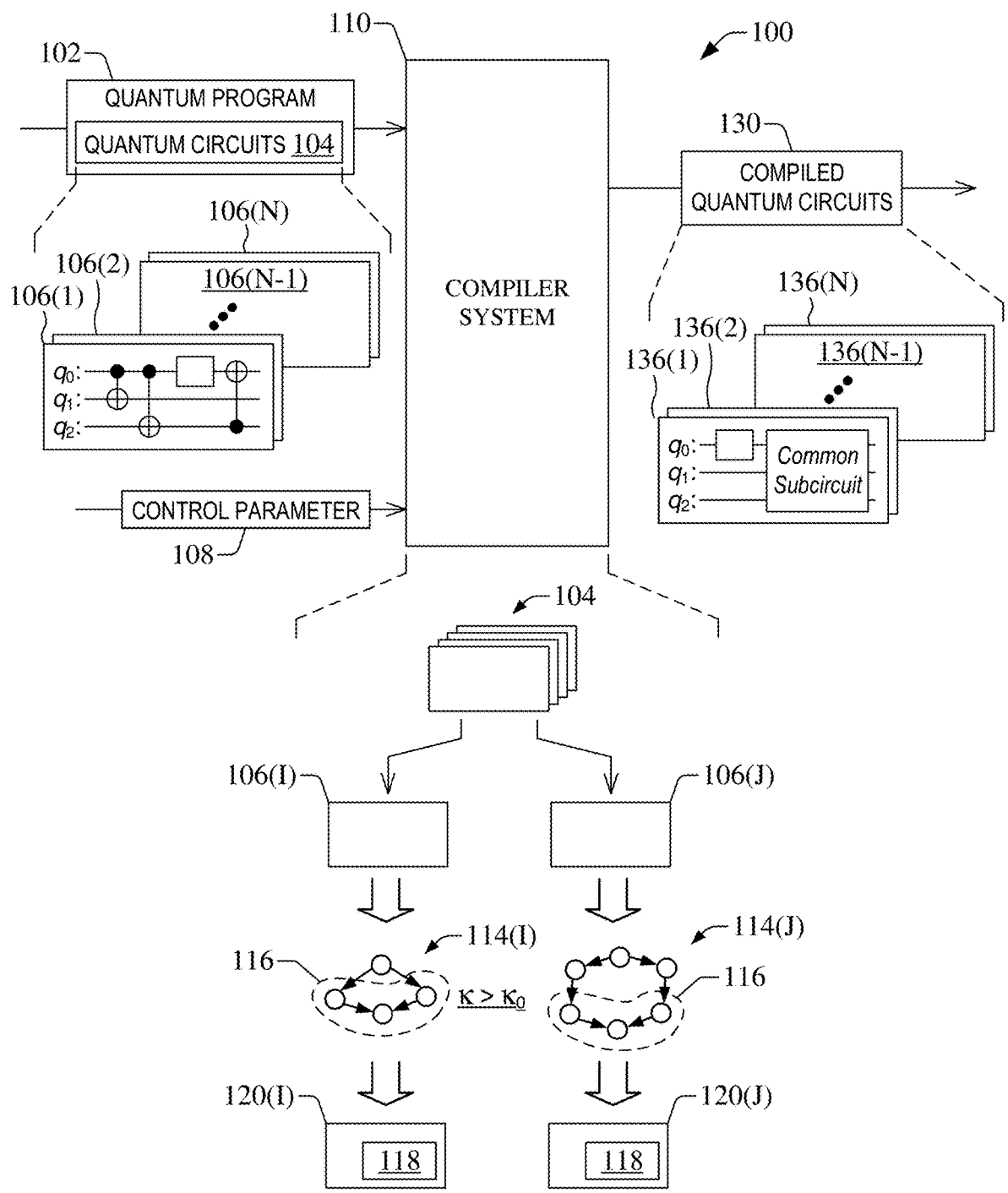
FIG. 1 illustrates a non-limiting example of an operational environment for compilation of a quantum program, in accordance with one or more embodiments described herein.

Embodiments of this disclosure address the issue of compilation of a quantum program. In quantum computing, a set of quantum circuits can be sent to a same target quantum computer. Each quantum circuit in the set of quantum circuits is compiled based on physical properties of the target quantum computer. Those physical properties can be determined, at least partially, by the qubit architectures utilized for quantum computing and the electronic devices utilized to exchange information with the target quantum computer. In some situations, the quantum circuits included in the set of quantum circuits can have a large number of common subcircuits. As a result, compilation of each quantum circuit can be highly inefficient because of repetitive compilation involving those common subcircuits.

Rather than compiling a quantum program by compiling constituent quantum circuits individually and in their entireties, embodiments of this disclosure can compile the quantum program by identifying common quantum subcircuits among pairs of quantum circuits present in the quantum circuits 104. Each one of the common quantum subcircuits can then be compiled individually a single time. As a result, even when compilation of one or many of the common quantum subcircuits includes transpilation of the common quantum subcircuit, the transpilation is performed a single time for each of the one or many quantum subcircuits. Accordingly, those quantum subcircuits can be optimized efficiently despite transpilation including determining a solution of non-polynomial (NP)-hard problems, such as layout selection and/or circuit routing. Further, because the number of transpilations can be reduced relative to commonplace approaches to compilation of a quantum program, embodiments of the disclosure provide more efficient compilation of quantum programs.

During compilation of quantum program, embodiments of this disclosure can replace respective portions of both a first quantum circuit and a second quantum circuit including the common quantum subcircuit with the compiled common quantum subcircuit. In this fashion, the efficiency of the compilation of the quantum program can be further increased relative to commonplace approaches to compilation of a quantum programs.

By identifying common quantum subcircuits in the quantum circuits that constitute a quantum program, embodiments of this disclosure can eliminate redundant compilation for same quantum subcircuits. Hence, embodiments of this disclosure can provide efficient compilation of the quantum programs, reducing compilation time and/or reducing computing resources utilized to compile a quantum program. Therefore, embodiments of these disclosure can utilize less processing unit time (e.g., CPU time, GPU time, and/or TPU time); memory; network bandwidth; or a combination of those. Processing unit time can include, for example, central processing unit (CPU) time, graphics processing unit (GPU) time, tensor processing unit (TPU) time, or time utilized by a combination of such processing units during compilation of a quantum program.

With reference to the drawings, FIG. 1 illustrates a non-limiting example of an operational environment 100 for compilation of a quantum program, in accordance with one or more embodiments described herein. As mentioned, the compilation of the quantum program 102 includes identification of quantum subcircuits within the quantum program 102. The quantum program 102 can define one or several quantum algorithms. The compiler system 110 can receive the quantum program 102 for compilation. As such, the compiler system 110 can receive data defining a set of quantum circuits 104 that represents at least a portion of the quantum program 102. In some cases, the set of quantum circuits 104 includes particular quantum circuits representing a quantum algorithm (such as a variational quantum algorithm) included in the quantum program 102. In some embodiments, the set of quantum circuits 104 can include multiple quantum circuits, including a first quantum subcircuit 106(1), a second quantum subcircuit 106(2), and continuing up to an (N−1)-th quantum subcircuit 106(N−1) and an N-th quantum circuit 106 (N). Here, N can be a natural number greater than two.

Figure 2A:
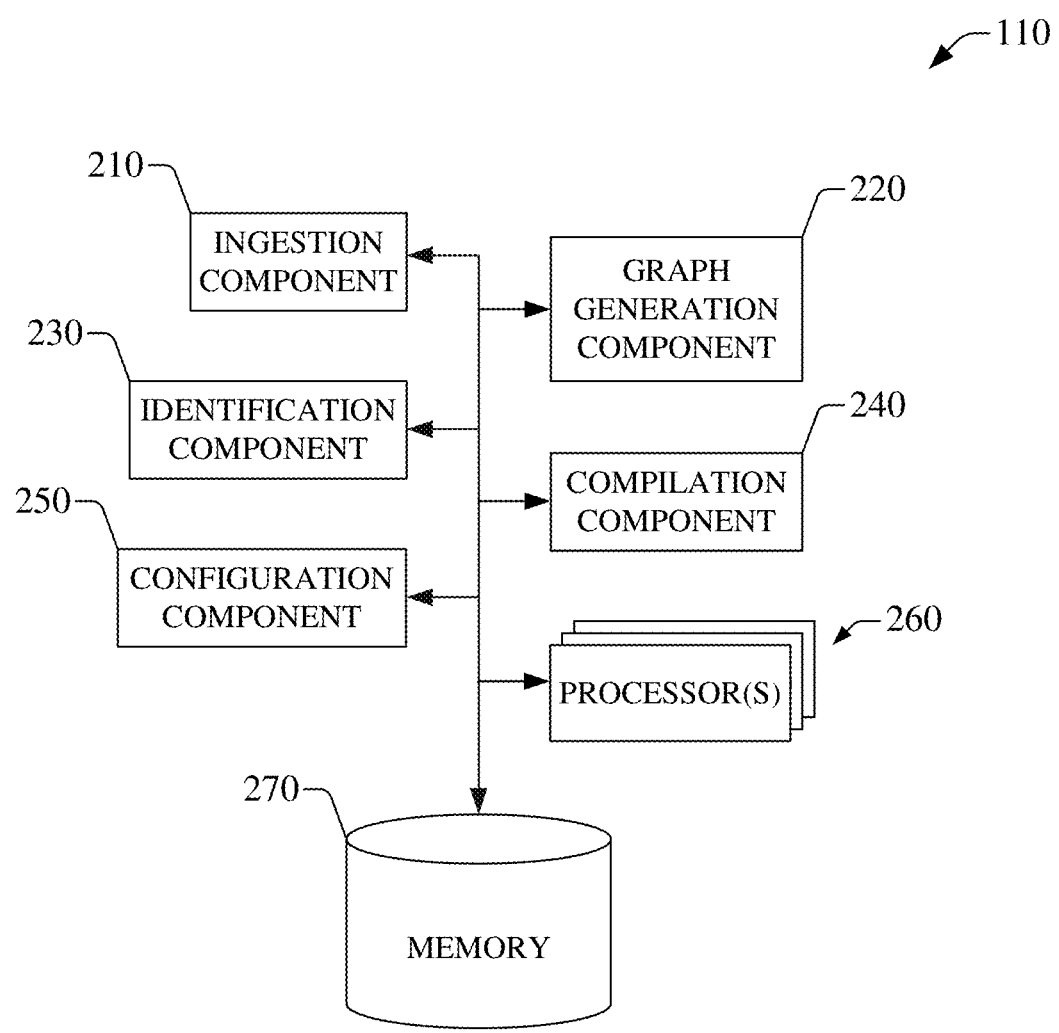
FIG. 2A illustrates a non-limiting example of a system for compilation of a quantum program, in accordance with one or more embodiments of this disclosure.

Each one of the quantum circuits 106(k) (k=1, 2, . . . , N−1, N) can include one or several of various quantum gates. Those quantum gates can include, for example, a Pauli gate, a Hadamard gate, a rotation gate ($R_Z$ gate and phase shift gate, for example), a controlled-phase shift gate, a controlled-NOT ($C_X$) gate, a Toffoli (or controlled-controlled-NOT) gate, a swap gate, a Fredkin gate, among many other gates. Simply for the sake of illustration, the quantum circuit 106(1) is shown as including three $C_X$ gates and one single-qubit gate (such as $R_Z$ gate or Hadamard gate). In some embodiments, as is illustrated in FIG. 2A, the compiler system 110 can include an ingestion component 210 that can receive the quantum program 102, including the data defining the set of quantum circuits 104. As is also illustrated in FIG. 2A, the compiler system 110 also can include multiple other components, one or several processors 260, and data repositories, including one or several memory devices 270 (referred to as memory 270). The multiple components, the processor(s) 260, and the data repositories can be electrically, optically and/or communicatively coupled to one another.

Rather than compiling the quantum program 102 by compiling each one of the quantum circuits 104 individually and in its entirety, the compiler system 110 begins the compilation of the quantum program 102 by identifying common quantum subcircuits among pairs of quantum circuits present in the quantum circuits 104. Without intending to be bound by theory and/or modeling, a quantum subcircuit refers to a self-contained quantum circuit that appears as a "black box" in other quantum circuits. To identify a common quantum subcircuit, the compiler system 110 can select a pair of quantum circuits from the multiple quantum circuits 106(k), and can then obtain graph representations for respective quantum circuits in the pair of quantum circuits.

The graph representations can be defined in a same graph basis G. Each one of the graph representations can be embodied in a commutation directed acyclic graph (DAG). A graph representation includes a set of vertices and a set of edges. The set of vertices is a non-empty set, where each vertex represents a quantum gate. The compiler system 110 can obtain a graph representation in numerous ways. In some other embodiments, the compiler system 110 can receive data (not depicted in FIG. 1) defining respective graph representations for the quantum circuits 104. Such data can be received as metadata for the data defining the quantum circuits 104. In addition, or in other embodiments, the compiler system 110 can obtain a graph representation of the quantum circuit by generating the graph representation. In those other embodiments, as is illustrated in FIG. 2A, the compiler system 110 can include a graph generation component 220 that can generate a set of commutation DAGs in the basis G for respective quantum circuits in the set of quantum circuits 104. To that end, in one aspect, the graph generation component 220 can generate a DAG from a quantum circuit, and can then use the DAG to generate a commutation DAG in the basis G.

Without intending to be bound by theory, a DAG refers to a finite directed graph with no cycles. In turn, a commutation DAG is a DAG where the vertices represent quantum gates and two or more of those quantum gates that have dependency and do not commute are connected with an edge. A first quantum gate representing an operator O and a second quantum gate representing an operator O' do not commute when the commutator [O, O']=OO'−O'O is non zero. Stated equivalently, the operator O and the operator O' commute if applying the operator O followed by the application of the operator O' yields the same result as applying the operator O' followed by the application of the operator O. Accordingly, because a quantum circuit can be represented as a DAG, the compiler system 110 can represent the quantum circuits included in the pair of quantum circuits as respective DAGs.

The compiler system 110 can then transform the respective DAGs into a first commutation DAG and a second commutation DAG. As is shown in FIG. 1, simply as an illustration, the pair of quantum circuits can include quantum circuit 106(I) and quantum circuit 106(J), where I≠J and I, J≤N. The commutation DAG representations for that pair are depicted by a first commutation DAG 114(1) and a second commutation DAG 114(J). The first commutation DAG 114(I) can include vertices (represented by solid circles) that represent quantum gates of the quantum circuit 106(I). A first vertex represents a first quantum gate of the quantum gates and a second vertex represents a second quantum gate of the quantum gates. In a scenario in which the first quantum gate and the second quantum gate have dependency and respective operator representations of such gates do not commute, the first vertex and the second vertex are connected with an edge. Similarly, the second commutation DAG 114(J) can include vertices (again represented by solid circles) that represent quantum gates of the quantum circuit 106(J). A first vertex represents a first quantum gate of the quantum gates and a second vertex represents a second quantum gate of the quantum gates. In a scenario in which the first quantum gate and the second quantum gate have dependency and respective operator representations of such gates do not commute, the first vertex and the second vertex are connected with an edge.

Figure 2B:
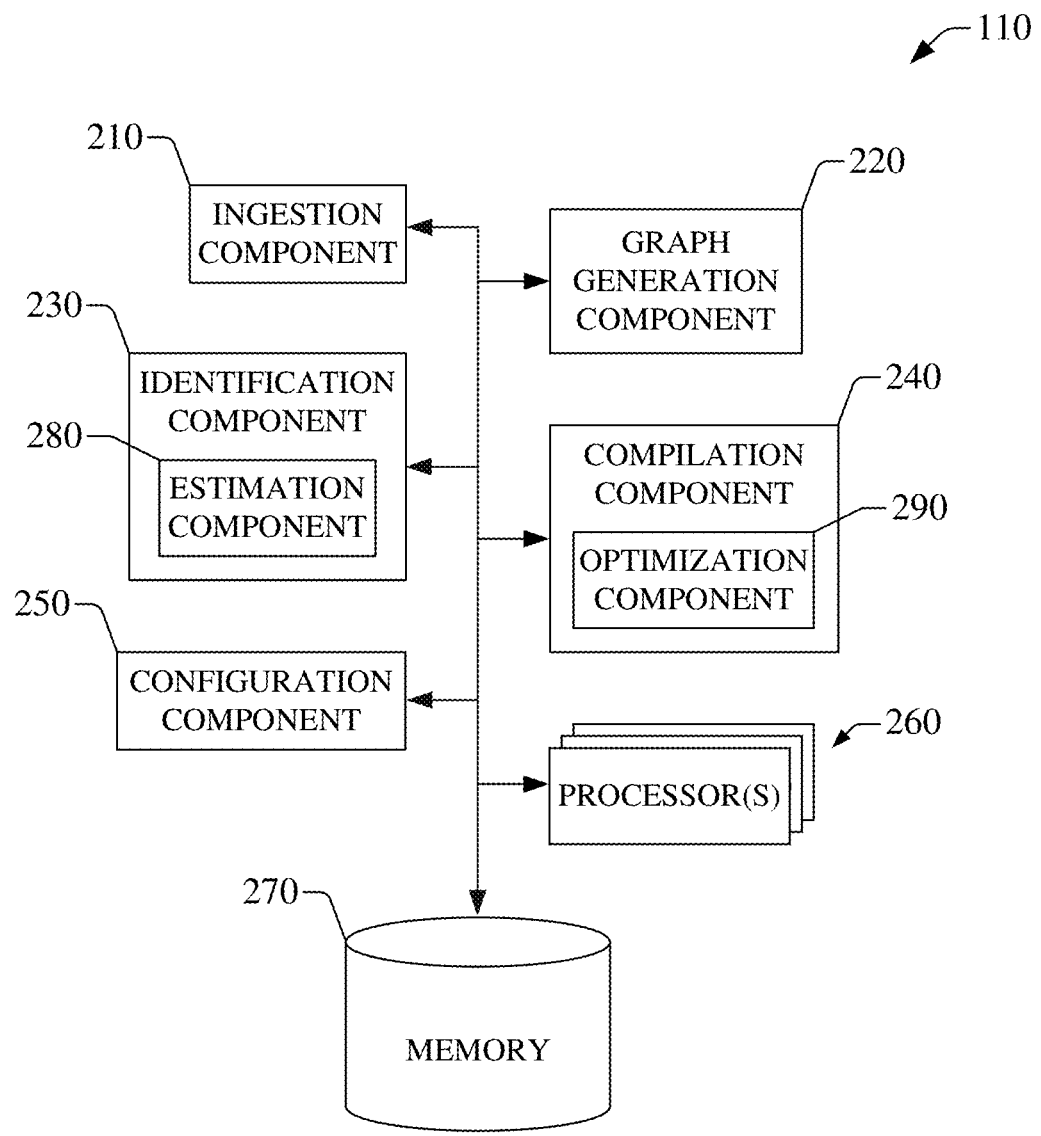
FIG. 2B illustrates a non-limiting example of another system for compilation of a quantum program, in accordance with one or more embodiments of this disclosure.

Further, to continue compilation of the quantum program in accordance with aspects of this disclosure, the compiler system 110 can evaluate the pair of quantum circuits using a defined function that yields an estimated upper bound (EUB) size of nodes in the maximum common subgraph (MCS) among commutation DAGs representing respective quantum circuits in the pair of quantum circuits. A common subgraph of two DAGs is a graph that is a subgraph of the two DAGs simultaneously. A maximum common subgraph is a subgraph having the largest number of vertices. Such a defined function is herein generically referred to as a EUB function and can be embodied in one of various lower-bound functions for MCS problems. In some cases, the EUB function can be embodied in the bound portion of a branch-and-bound algorithm for MCS problems. In such an algorithm, the bound portion includes a bound computation using a bounding function. For example, the EUB function can be embodied in the bound prediction formula of the McSplit algorithm. It is noted that determining an upper-bound size can be accomplished in sub-polynomial time and can be faster than identifying the MCS. In some embodiments, as is shown in FIG. 2B, the compiler system 110 can include an estimation component 280 that can evaluate the EUB function for a pair of quantum circuits. The EUB function can be evaluated for each one of a group of candidate common subgraphs among a first quantum circuit in the pair of quantum circuits and a second quantum circuit in the pair of quantum circuits. In some cases, the estimation component 280 can be included in the identification component 230, as is shown in FIG. 2B. The disclosure, however, is not limited in that respect.

With further reference to FIG. 1, the compiler system 110 can iteratively select all pairs of quantum circuits in the group of quantum circuits 106(k) and, for each selected pair, the compiler system 110 can obtain a first commutation DAG and a second commutation DAG representing the pair and can then determine an estimated upper-bound size for the pair by evaluating an EUB function. As a result, the compiler system 110 can determine a set of multiple upper-bound values $\kappa_1, \kappa_2, \ldots \kappa_{M-1}, \kappa M$, where $\kappa_s$ can be an integer, s=1, 2, . . . . M−1, M identifies a pair, and M is a natural number identifying the total number of pairs of quantum circuits that have been evaluated. In some cases, M can be the total number of unique pairs of circuits that can be formed with the set of quantum circuits 104.

The compiler system 110 can then use corresponding upper-bound estimates to distinguish between pairs of quantum circuits. To that end, in some embodiments, the compiler system 110 can order the set $\{\kappa_s\}$ in ascending order or in descending order. Because the upper-bound estimates can be determined based on an MCS between a pair or commutation DAGs, such a distinction can permit the compiler system 110 to identify common subgraphs having upper-bound estimates that exceed a threshold-size. As is illustrated in FIG. 1, in some embodiments, the compiler system 110 can receive a control parameter 108 defining the threshold size. Simply for the sake of nomenclature, the threshold size can be denoted as $\kappa_0$ and can be an integer greater than 2. For example, $\kappa_0$ can be equal to 3, 4, 5, 10, 15, 20, 30, 40, 50, or 100. Thus, the compiler system 110 can leverage the control parameter 108 to control a number of common subgraphs that are used to identify respective common quantum subcircuits among quantum circuits within the set of quantum circuits 104. In some embodiments, the ingestion component 210 (FIG. 2A) can receive the control parameter 108.

In addition, continuing with the compilation of the quantum program, the compiler system 110 can iteratively traverse the set of pairs of quantum circuits that have been evaluated, determining for each pair of quantum circuits if a corresponding upper-bound estimate $\kappa_s$ exceeds the threshold size $\kappa_0$. A determination that $\kappa_s$ is less than or equal to $\kappa_0$ can cause the compiler system 110 to maintain unchanged a first quantum circuit and a second quantum circuit that form the pair of quantum circuits. In the alternative, a determination that $\kappa_s$ is greater than $\kappa_0$ can cause the compiler system 110 to remove the pair of quantum circuits from the quantum circuits 104. The determination that $\kappa_s$ is greater than $\kappa_0$ also can cause the compiler system 110 to select the MCS among the first commutation DAG (e.g., commutation DAG 114(1)) and the second commutation DAG (e.g., commutation DAG 114(J)). As mentioned, the first commutation DAG represents the first quantum circuit and the second commutation DAG represents the second quantum circuit that form the pair of quantum circuits. The compiler system 110 can select the MCS—or another subgraph that is common among the first commutation DAG and the second commutation DAG—by identifying a particular set of vertices and a particular set of edges in the graph basis (e.g., G) utilized to represent the first commutation DAG and the second commutation DAG. The identified particular set of vertices and particular set of edges in the first commutation DAG are arranged in a configuration that matches a configuration of the identified particular set of vertices and particular set of edges in the second commutation DAG. In some embodiments, the identification component 230 (FIG. 2A) can select a pair of quantum circuits having an upper-bound estimate that exceeds the threshold size in accordance with aspects described above. In scenarios in which the identification component 230 selects a common subgraph other than MCS, the identification component 230 can apply one of several efficient heuristic algorithms to identify the common subgraph. Those algorithms permit handling the NP-hard nature of such a selection, and include, for example, the VF2 algorithm (a variation of the VF graph matching algorithm) and the index-based subgraph matching algorithm with general symmetries (ISMAGS).

The selected MCS also is a commutation DAG and, thus, can represent a quantum subcircuit that is common among the first commutation DAG and the second commutation DAG. Therefore, by finding common patterns in the graph representations of at least some of the quantum circuits 104, the compiler system 110 can identify common quantum subcircuits.

After selection of such an MCS, the compiler system 110 can continue the compilation of the quantum program by compiling the common quantum subcircuit represented by the MCS. Compilation of the common quantum subcircuit can include transpilation of the common quantum subcircuit. As such, as part of compilation, the compiler system 110 can modify the common quantum subcircuit by solving an optimization problem with respect to a performance function based on a layout of a set of gates of the common quantum subcircuit and one or several physical properties of a quantum computer that can execute the set of quantum circuits 104. Such a modification can be referred to as transpilation. The compiler system 110 can use the compiled common quantum subcircuit when compiling the first quantum circuit corresponding to the first commutation DAG, the second quantum circuit corresponding to the second commutation DAG, and other quantum circuits that also are associated with the MCS. In some embodiments, as is shown in FIG. 2A, the compiler system 110 can include a compilation component 240 that can compile the MCS—or another subgraph that is common among the first commutation DAG and the second commutation DAG. In addition, or in some embodiments, as is shown in FIG. 2B, the compilation component 240 can include an optimization component 290 that can modify the common quantum subcircuit by solving the optimization problem mentioned above.

The common quantum subcircuit can be compiled a single time during the compilation of the quantum program 102. As a result, utilization of the compiled common quantum subcircuit can improve compilation efficiency relative to commonplace approaches to compilation of the quantum program 102. Again, rather than compiling the first quantum circuit and the second quantum circuit individually in their entireties, the compiler system 110 can utilize the compiled common subcircuit to speed up compilation of the entire quantum program 102.

To that end, the compiler system 110 can replace a portion of the first quantum circuit represented by the first commutation DAG with the compiled common quantum subcircuit. The compiler system 110 also can replace a portion of the second quantum circuit represented by the second commutation DAG with the compiled common quantum subcircuit. As a result, a first replacement quantum circuit for the first quantum circuit includes the common quantum subcircuit and other gates not common with the second quantum circuit. In addition, a second replacement quantum circuit for the second quantum circuit includes the common quantum subcircuit and other gates not common with the first quantum circuit. In some embodiments, the compiler system 110 can include a configuration component 250 (FIG. 2A) that can replace the common quantum subcircuit in accordance with aspects described above.

Simply as an illustration, the commutation DAG 114(I) and the commutation DAG 114(J) depicted in FIG. 1 can have an MCS 116 having an upper-bound estimate that exceeds $\kappa_0$. In determining the MCS 116, the compiler system 110 (via the identification component 230 (FIG. 2A), for example) can identify a set of three nodes and two edges within the commutation DAG 114(I) that are arranged in a configuration that matches the configuration of those nodes and edges in the commutation DAG 114(J). The MCS 116 can represent a common quantum subcircuit 118. Hence, the compiler system 110 can replace the quantum circuit 106(1) with a replacement quantum circuit 120(I) that includes the common quantum subcircuit 118 and other quantum gates (not depicted in FIG. 1) not common with those present in the quantum circuit 106(J). In addition, the compiler system 110 also can replace the quantum circuit 106(J) with a replacement quantum circuit 120(J) that includes the common quantum subcircuit 118 and other second gates not common with those present in the quantum circuit 106(1).

The compiler system 110 can continue the identification of pairs having an upper-bound estimate that exceeds $\kappa_0$ and the selection of corresponding MCSs over the quantum circuits 104. The compiler system 110 can then compile the quantum subcircuits corresponding to respective MCSs individually, and can replace the compiled quantum subcircuits in corresponding quantum circuits, as is described above. As a result, the compiler system 110 can generate compiled quantum circuits 130. As is shown in FIG. 1, the compiled quantum circuits 130 can include multiple compiled quantum circuits containing respective compiled common subcircuits. The multiple compiled quantum circuits can include, for example, a first compiled quantum circuit 136 (1), a second compiled quantum subcircuit 136(2), continuing up to an (N−1)th compiled quantum subcircuit 136(N−1) and an Nth compiled quantum subcircuit 136 (N).

By identifying common quantum subcircuits in the quantum circuits that constitute a quantum program, the compiler system 110 can eliminate redundant compilation for same quantum subcircuits present in the quantum circuits 104. As a result, the compiler system 110 can provide efficient compilation of the quantum programs, reducing compilation time and/or reducing computing resources utilized to compile a quantum program. Therefore, embodiments of these disclosure can utilize less processing unit time, memory, network bandwidth, or a combination of those. In embodiments in which the quantum circuits 106(k) share large number of common quantum subcircuits, the compiler system 110 can reduce overall compilation time by about N times relative to commonplace approaches.

Substantial compilation speed-up factors can be attained in other embodiments. As an example, in embodiments in which the quantum program 102 includes a variational quantum algorithm and multiple quantum circuits of the quantum circuits 104 utilize a same ansatz design, common quantum subcircuits among pairs of multiple quantum circuits can be embodied in one or a few ansatz quantum circuits. Accordingly, after the compiler system 110 compiles a first ansatz circuit embodying a first common quantum subcircuit for the variational quantum algorithm, the compiler system 110 can leverage such a compilation to other compilations of other ansatz circuits. Without intending to be bound by theory, in the context of variational circuits, an ansatz can describe a defined quantum subcircuit type including a sequence of gates applied to specific wires.

Figure 3:
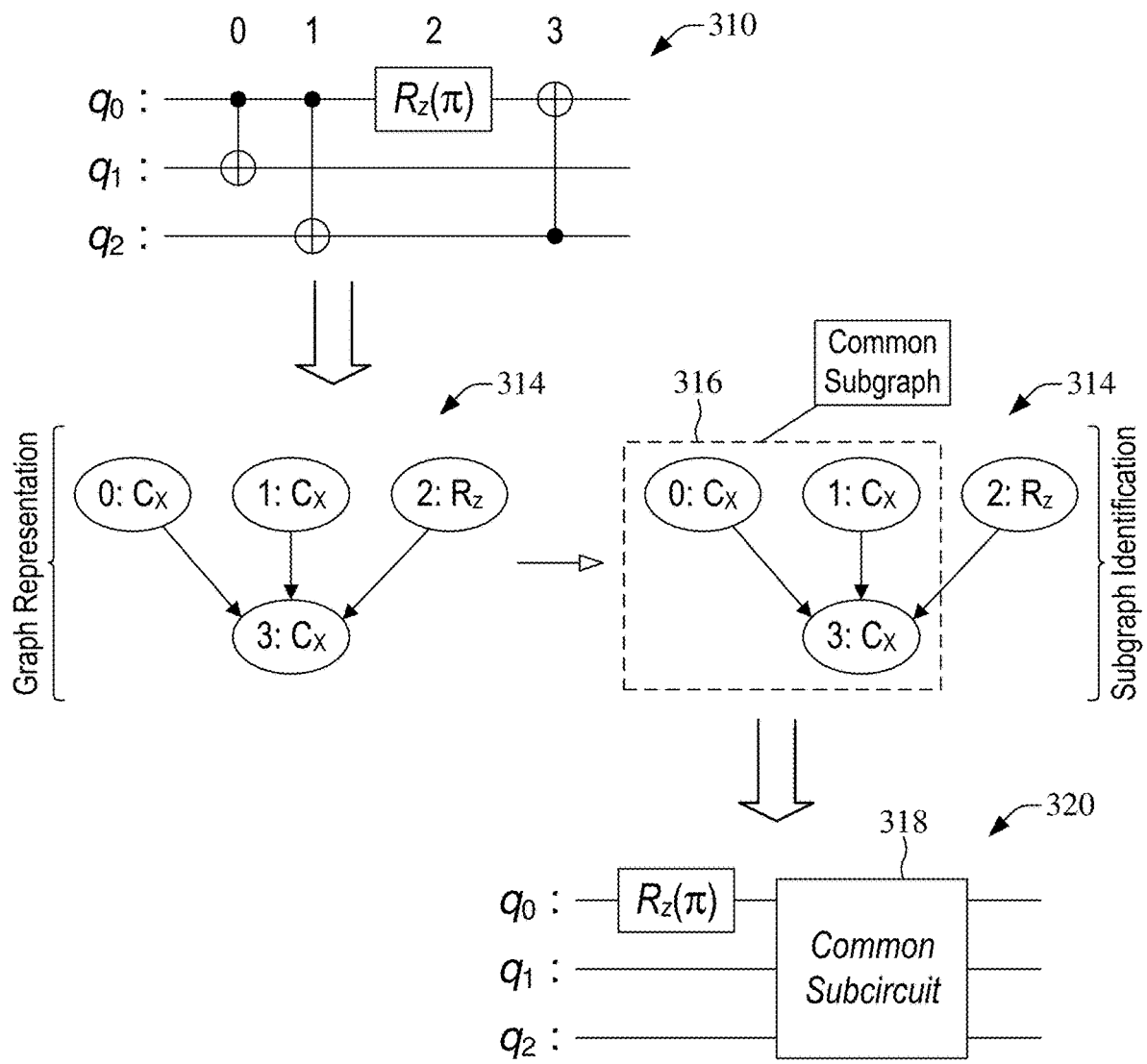
FIG. 3 illustrates a non-limiting example of a quantum circuit that can be included in a quantum program, in accordance with one or more embodiments of this disclosure.

FIG. 3 illustrates a non-limiting example of a quantum circuit 310 that can be included in the quantum program 102 (FIG. 1), in accordance with one or more embodiments of this disclosure. Simply for the sake of illustration, the quantum circuit 310 includes a first qubit $q_0$, a second qubit $q_1$, and a third qubit $q_2$. The quantum circuit 310 also includes four gates: a first $C_X$ gate, a second $C_X$ gate, a rotation gate $R_Z$ corresponding to a rotation of $\pi$ about a $\hat{Z}$ axis, and a third $C_X$ gate. Numerals "0," "1," "2," and "3" indicate order of operations in the quantum circuit 310.

The quantum circuit 310 can be represented as a commutation DAG 314 in a particular graph basis G. Numerals "0," "1," "2," and "3" shown in nodes of the commutation DAG 314 correspond to respective operations in the quantum circuit 310, according to the order shown in the quantum circuit 310. As mentioned, in some embodiments, the compiler system 110 (via the graph generation component 220, for example) can generate the commutation DAG 314 from a DAG (not depicted in FIG. 3) also representing the quantum circuit 310. The compiler system 110 can use the commutation DAG 314 to identify a subgraph 316 that is common among the quantum circuit 310 and a second quantum circuit (not depicted in FIG. 3) that also can be included in the quantum circuits 104. That second quantum circuit also can be represented as a commutation DAG in the graph basis G.

The common subgraph 316 is a commutation DAG and can thus represent a quantum subcircuit 318 that is common among the quantum circuit 310 and the second quantum circuit. The compiler system 110 can then utilize the common quantum subcircuit 318 (represented by a block 318 in FIG. 3) to replace a portion of the quantum circuit 310, as is described above. As a result, the compiler system 110 (via the configuration component 250, for example) can replace the quantum circuit 310 with a quantum circuit 320 that includes the common quantum subcircuit 318 and other gates not common with the second quantum circuit. The compiler system 110 also can utilize the common quantum subcircuit 318 to replace a portion of the second quantum circuit.

The compiler system 110 can then compile the common quantum subcircuit 318. During compilation of a quantum program including the quantum circuit 310 and the second quantum circuit, the compiler system 110 can utilize the compiled common quantum subcircuit when compiling both the quantum circuit 310 and the second quantum circuit. Thus, as described above, rather than compiling the quantum circuit 310 and the second quantum circuit individually in their entireties, the compiler system 110 can utilize the compiled common quantum subcircuit to speed up compilation of the entire quantum program. To that end, the compiler system 110 can replace the compiled common quantum subcircuit in both the quantum circuit 310 and the second quantum circuit, and can compile the uncommon portions of those quantum circuits. Because the common quantum subcircuit 318 can be compiled a single time during the compilation of the quantum program, utilization of the common quantum subcircuit 318 can improve compilation efficiency.

Figure 4:
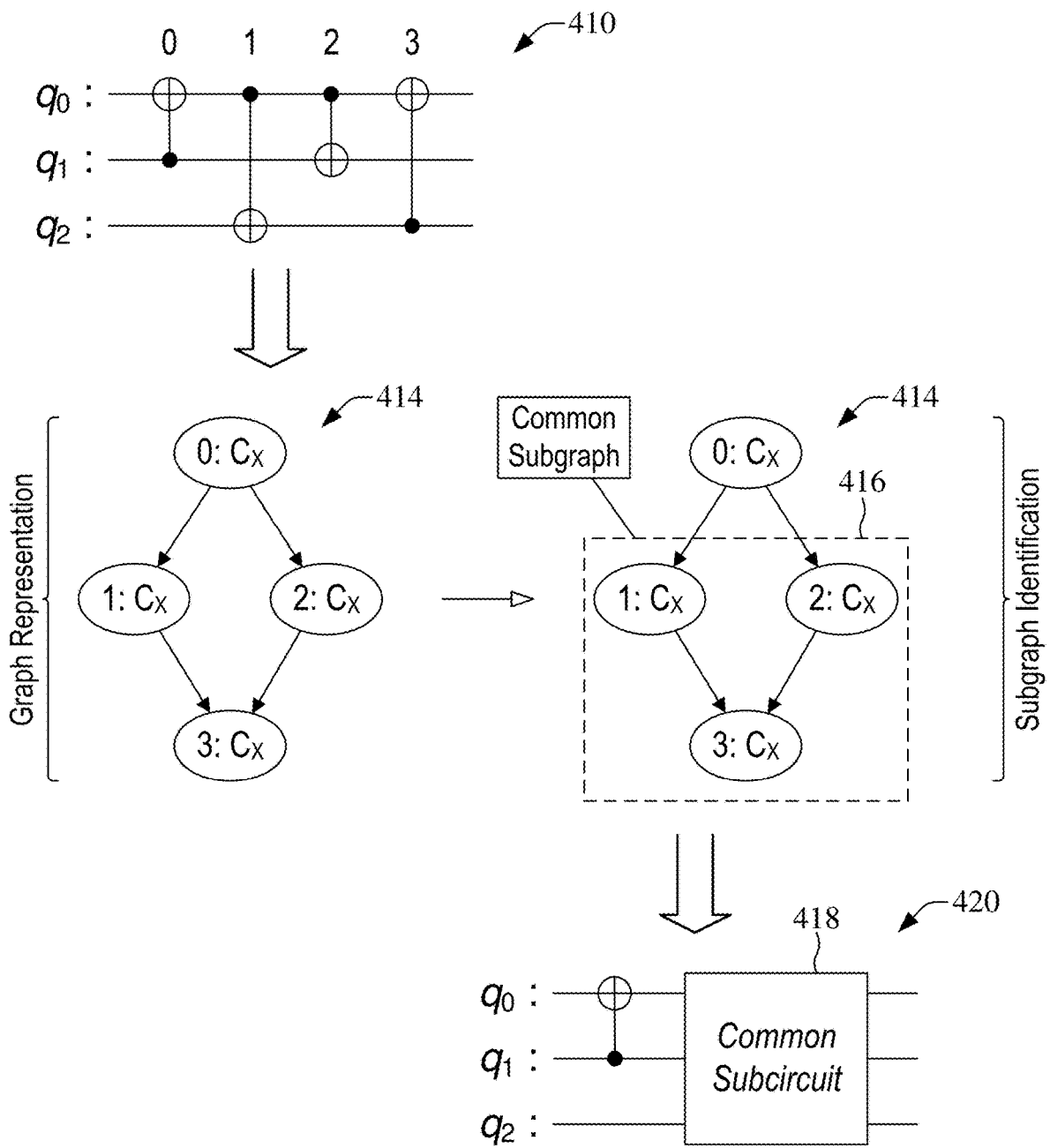
FIG. 4 illustrates a non-limiting example of another quantum circuit that can be included in a quantum program, in accordance with one or more embodiments of this disclosure.

As mentioned, a quantum program (e.g., quantum program 102) can include other quantum circuits. For at least one of those other quantum circuits, respective one or more common quantum subcircuits can be identified and replaced during compilation. FIG. 4 presents a non-limiting example of a quantum circuit 410 that, in some cases, also can be included in the quantum program that includes the quantum circuit 310 (FIG. 3). Accordingly, the quantum circuit 410 also can be defined in terms of three-qubit register including the first qubit $q_0$, the second qubit $q_1$, and the third qubit $q_2$. Simply for the sake of illustration, the quantum circuit 410 includes four gates: a first $C_X$ gate, a second $C_X$ gate, a third $C_X$ gate, and a fourth $C_X$ gate. Numerals "0," "1," "2," and "3" indicate order of operations in the quantum circuit 410.

The quantum circuit 410 can be represented as a commutation DAG 414 in the graph basis G. In some embodiments, the compiler system 110 (via the graph composition component, for example) can generate the commutation DAG 414 from a DAG (not depicted in FIG. 4) also representing the quantum circuit 410. The compiler system 110 can use the commutation DAG 414 to identify a subgraph 416 that is common among the quantum circuit 410 and a second quantum circuit (not depicted in FIG. 4) also included in the quantum program. That second quantum circuit also can be represented as a commutation DAG in the graph basis G.

The common subgraph 416 is a commutation DAG and can thus represent a quantum subcircuit 418 that is common among the quantum circuit 310 and the second quantum circuit. The compiler system 110 can then utilize the common quantum subcircuit 418 (represented by a block 418 in FIG. 4) to replace a portion of the quantum circuit 410. As a result, the quantum circuit 410 can be replaced by a quantum circuit 420 that includes the common quantum subcircuit 418 and other gates not common with the second quantum circuit. The compiler system 110 also can utilized the common quantum subcircuit 318 to replace a portion of the second quantum circuit.

The compiler system 110 can then compile the common quantum subcircuit 418 can be compiled. During compilation of the quantum program including the quantum circuit 410 and the second quantum circuit, the compiler system 110 can utilize the compiled common subcircuit when compiling both the quantum circuit 410 and the second quantum circuit. Thus, rather than compiling the quantum circuit 410 and the second quantum circuit individually in their entireties, the compiler system 110 can utilize the compiled common subcircuit to speed up compilation of the entire quantum program. To that end, the compiler system 110 can replace the compiled common subcircuit in both the quantum circuit 410 and the second quantum circuit, and can compile the uncommon portions of those quantum circuits. Again, because the common quantum subcircuit 418 can be compiled a single time during the compilation of the quantum program, utilization of the common quantum subcircuit 418 can improve compilation efficiency.

FIG. 5 illustrates a non-limiting example of pseudocode for an example technique 500 to identify a quantum subcircuit and replace the quantum subcircuit during compilation of a quantum program, in accordance with one or more embodiments of this disclosure. In the pseudocode, the "$pair_1$" and "$pair_2$" denote, respectively, a first quantum circuit and a second quantum circuit in a pair of quantum circuits. Although at line 4 of the example technique 500 the set of pairs of quantum circuits is ordered in decreasing order, the disclosure is not limited in that respect, as mentioned above. Because determining an upper-bound size can be faster than identifying an MCS, the example technique 500 leverages the threshold size $\kappa_0$ (e.g., a lower bound; denoted by kappa0 in FIG. 5) to distinguish between pairs of quantum circuits for which MCSs are not identified and other pairs of quantum circuits for which MCSs are identified. For each identified MCS, the common quantum subcircuit corresponding to the identified MCS is compiled. The compiled common quantum subcircuit replaces a portion of each of the quantum circuits corresponding to $pair_1$ and $pair_2$, in accordance with aspects described herein.

Figure 6:
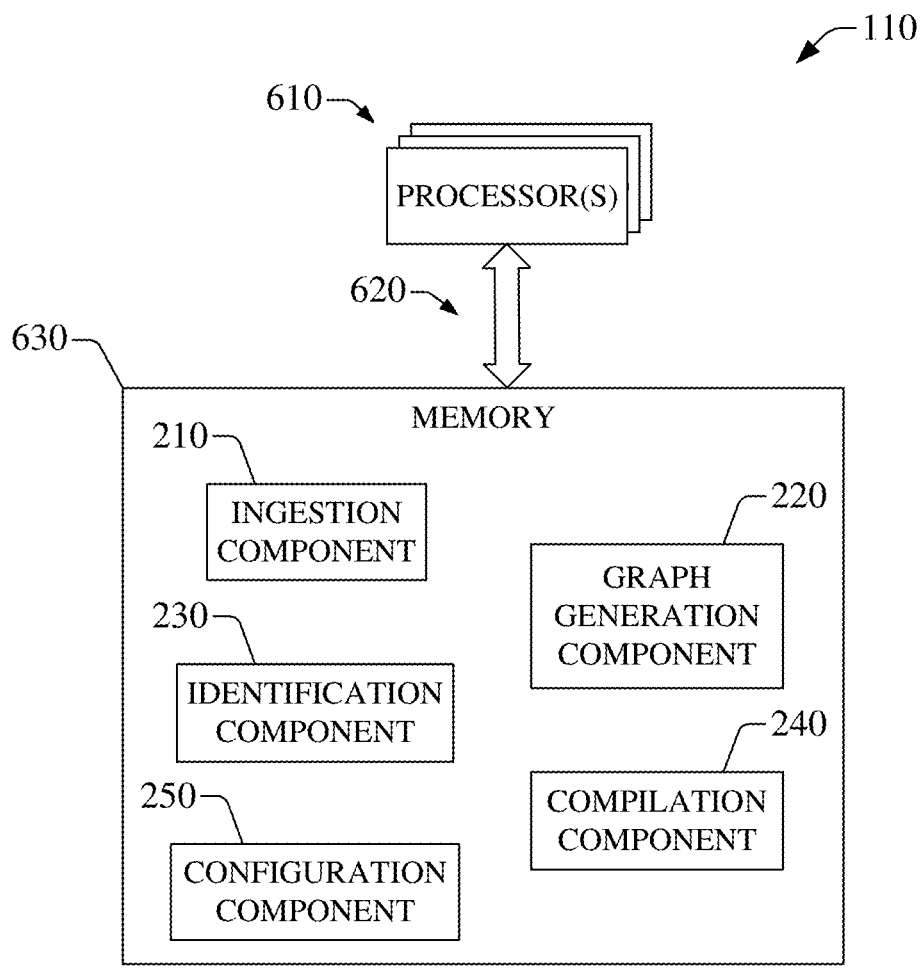
FIG. 6 illustrates a non-limiting example of a computing system for compilation of a quantum program, in accordance with one or more embodiments of these disclosure.

FIG. 6 illustrates a block diagram of a non-limiting example of the compiler system 110 for identification of a quantum subcircuit and replacement during compilation of a quantum program, in accordance with one or more embodiments of these disclosure. As is illustrated in FIG. 6, the compiler system 110 can include one or several processors 610 and one or several memory devices 630 (referred to as memory 630). In some embodiments, the processor(s) 610 can be arranged in a single computing apparatus (a blade server device or another type of server device, for example). In other embodiments, the processor(s) 610 can be distributed across two or more computing apparatuses (e.g., multiple blade server devices or other types of server devices).

The processor(s) 610 can be operatively coupled to the memory 630 via one or several communication interfaces 620, for example. The communication interface(s) 620 can be suitable for the particular arrangement (localized or distributed) of the processor(s) 610. In some embodiments, the communication interface(s) 620 can include one or many bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

The memory 630 can retain or otherwise store therein machine-accessible components (e.g., computer-readable and/or computer-executable components) in accordance with this disclosure. As such, in some embodiments, machine-accessible instructions (e.g., computer-readable and/or computer-executable instructions) embody or otherwise constitute each one of the machine-accessible components within the memory 630. The machine-accessible instructions can be encoded in the memory 630 and can be arranged to form each one of the machine-accessible components. The machine-accessible instructions can be built (e.g., linked and compiled) and retained in computer-executable form within the memory 630 or in one or several other machine-accessible non-transitory storage media. Specifically, as is shown in FIG. 6, in some embodiments, the machine-accessible components include the ingestion component 210, the graph generation component 220, the identification component 230, the compilation component 240, and the configuration component 250. The memory 730 also can include data (not depicted in FIG. 6) that permits various of the functionalities described herein. In some embodiments, the identification component 230 can include the estimation component 280, and the compilation component 240 can include the optimization component 290.

The machine-accessible components, individually or in a particular combination, can be accessed and executed by at least one of the processor(s) 610. In response to execution, each one of the machine-accessible components can provide the functionality described herein in connection with compilation of a quantum program. Accordingly, execution of the computer-accessible components retained in the memory 630 can cause the compiler system 110 to operate in accordance with aspects described herein. More concretely, at least one of the processor(s) 610 can execute the machine-accessible components to cause the compiler system 110 to compile the quantum program by identifying one or many quantum subcircuits within the quantum program, compiling the quantum subcircuit(s), and replacing the compiled quantum subcircuit(s) during compilation of the quantum program, in accordance with aspects of this disclosure.

Although not illustrated in FIG. 6, the compiler system 110 also can include other types of computing resources that can permit or otherwise facilitate the execution of the machine-accessible components retained in the memory 630. Those computing resources can include, for example, central processing units (CPUs), graphics processing units (GPUs), tensor processing units (TPUs), memory, disk space, incoming bandwidth, and/or outgoing bandwidth, interface(s) (such as I/O interfaces); controller devices(s); power supplies; and the like. For instance, the memory 630 also can include programming interface(s) (such as APIs); an operating system; software for configuration and or control of a virtualized environment; firmware; and similar.

Figure 7:
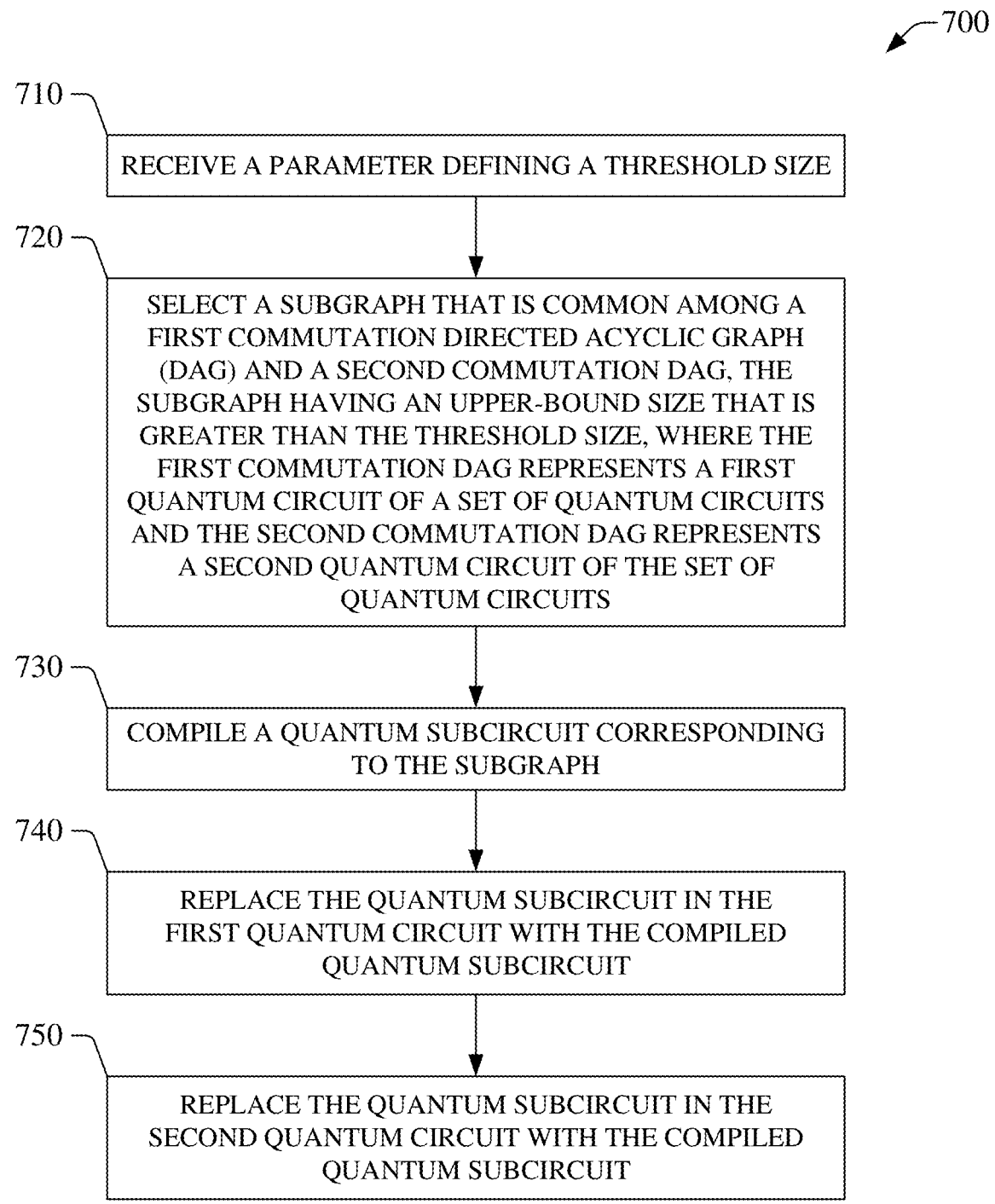
FIG. 7 illustrates an example of a method for compiling a quantum program, in accordance with one or more embodiments of these disclosure.

FIG. 7 illustrates a non-limiting example of a computer-implemented method 700 for compiling a quantum program, in accordance with one or more embodiments of these disclosure. The quantum program can be embodied in the quantum program 102 (FIG. 1) in some cases. A computing system can implement, at least partially, the computer-implemented method 700. Implementing the computer-implemented method 700 can include compiling or executing, or both, one or several of the blocks included in the computer-implemented method 700, for example. The computing system can include and/or can be operatively coupled to one or several processors, one or several memory devices, other types of computing resources (such as communication interface(s)), a combination thereof, or similar resources. In some embodiments, the computing system can be embodied in, or can constitute, the compiler system 110 in accordance with the various embodiments disclosed herein.

A block 710, the computing system can receive a parameter defining a threshold size. The parameter can be received via the ingestion component 210 (FIG. 2A and FIG. 2B) in some embodiments. In some cases, the parameter can be an integer greater than 2. For instance, the parameter can be equal to 3, 4, 5, 10, 15, 20, 30, 40, 50, or 100. The parameter can be embodied in the control parameter 108 (FIG. 1), for example, and can thus define $\kappa_0$.

At block 720, the computing system can select (via the identification component 230 (FIG. 2A and FIG. 2B), for example) a subgraph that is common among a first commutation DAG and a second commutation DAG. The first commutation DAG represents a first quantum circuit of a set of quantum circuits. The second commutation DAG represents a second quantum circuit of the set of quantum circuits. As mentioned, the set of quantum circuits includes, in some cases, first quantum circuits representing a quantum algorithm (such as a variational quantum algorithm). In some embodiments, the set of quantum circuits can be embodied in the quantum circuits 104 (FIG. 1), and the first commutation DAG and the second commutation DAG can represent, respectively, a first quantum circuit and a second quantum circuit of the quantum circuits 106(1) to 106(N).

Selecting the subgraph can include identifying a particular set of vertices and a particular set of edges in a graph basis (e.g., G) utilized to represent the first commutation DAG and the second commutation DAG. An arrangement of the particular set of vertices and the set of edges in the first commutation DAG matches an arrangement of the particular set of vertices and the set of edges in the second commutation DAG. See, for example, first commutation DAG 114(I) and a second commutation DAG 114(J) in FIG. 1. Although identifying such a common subgraph can be an NP-hard problem, the computing system can apply one of several efficient heuristic algorithms to identify the common subgraph. Those algorithms include, for example, the VF2 algorithm and (ISMAGS).

In some cases, the subgraph can have an upper-bound size that is greater than the threshold size. The computing system can determine the upper-bound size via the estimation component 280 (FIG. 2B), for example. In addition, or in other cases, selecting the subgraph can include selecting a largest subgraph that is common among the first commutation DAG and the second commutation DAG. Accordingly, in some embodiments, selecting the subgraph can include determining the upper-bound size of the subgraph by evaluating a lower-bound function for MCS for nodes in one or more candidate common subgraphs among the first commutation DAG and the second commutation DAG.

At block 730, the computing system can compile (via the compilation component 240 (FIG. 2A and FIG. 2B), for example) the quantum subcircuit corresponding to the subgraph. Because the subgraph is common among the first commutation DAG and second commutation DAG, the quantum subcircuit also is common among the first quantum circuit and the second quantum circuit. Compiling the quantum subcircuit can include, in some embodiments, modifying the quantum subcircuit by solving an optimization problem with respect to a performance function based on a layout of a set of gates of the quantum subcircuit and one or more physical properties of a quantum computer that executes the set of quantum circuits. The quantum subcircuit can be modified a single time during compilation of the set of quantum circuits. The computing system can modify the quantum subcircuit via the optimization component 290 (FIG. 2B) in some cases.

At block 740, the computing system can replace (via the configuration component 250 (FIG. 2), for example) the quantum subcircuit in the first quantum circuit with the compiled quantum subcircuit. At block 750, the computing system can replace (also via the configuration component 250, for example) the quantum subcircuit in the second quantum circuit with the compiled quantum subcircuit.

Figure 8:
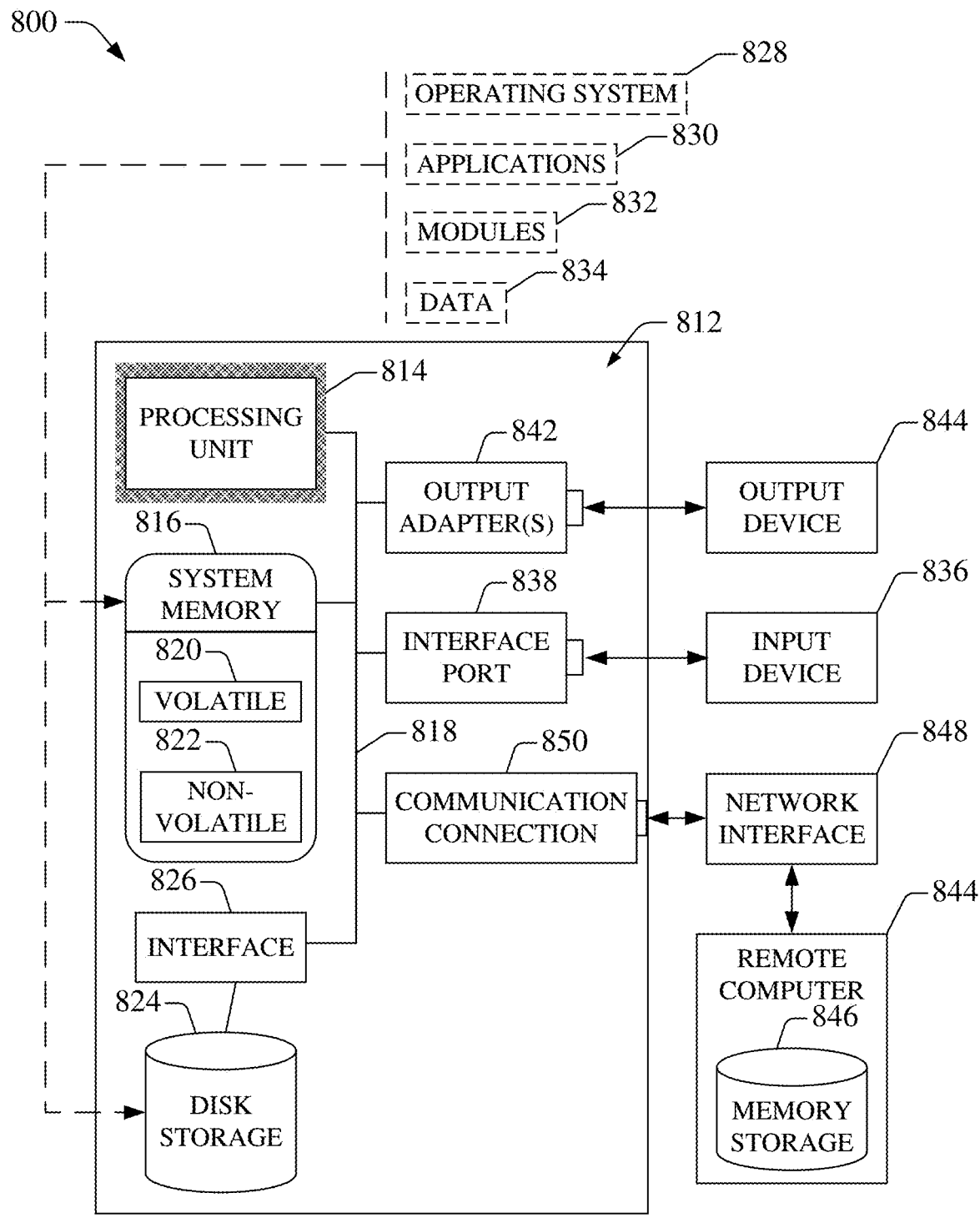
FIG. 8 is a block diagram of a non-limiting example of an operating environment in which one or more embodiments described herein can be implemented.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity. A suitable operating environment 800 for implementing various aspects of this disclosure can include a computer 812. The computer 812 can also include a processing unit 814, a system memory 816, and a system bus 818. The system bus 818 can operably couple system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, can be stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface can be used, such as interface 826. FIG. 8 also depicts software that can act as an intermediary between users and the basic computer resources described in the suitable operating environment 800. Such software can also include, for example, an operating system 828. Operating system 828, which can be stored on disk storage 824, acts to control and allocate resources of the computer 812. System applications 830 can take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through one or more input devices 836. Input devices 836 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 814 through the system bus 818 via one or more interface ports 838. The one or more Interface ports 838 can include, for example, a serial port, a parallel port, a game port, and a universal serial bus (USB). One or more output devices 840 can use some of the same type of ports as input device 836. Thus, for example, a USB port can be used to provide input to computer 812, and to output information from computer 812 to an output device 840. Output adapter 842 can be provided to illustrate that there are some output devices 840 like monitors, speakers, and printers, among other output devices 840, which require special adapters. The output adapters 842 can include, by way of illustration and not limitation, video and sound cards that provide a means of connection between the output device 840 and the system bus 818. It should be noted that other devices and/or systems of devices provide both input and output capabilities such as one or more remote computers 844.

Computer 812 can operate in a networked environment using logical connections to one or more remote computers, such as remote computer 844. The remote computer 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer 844. Remote computer 844 can be logically connected to computer 812 through a network interface 848 and then physically connected via communication connection 850. Further, operation can be distributed across multiple (local and remote) systems. Network interface 848 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
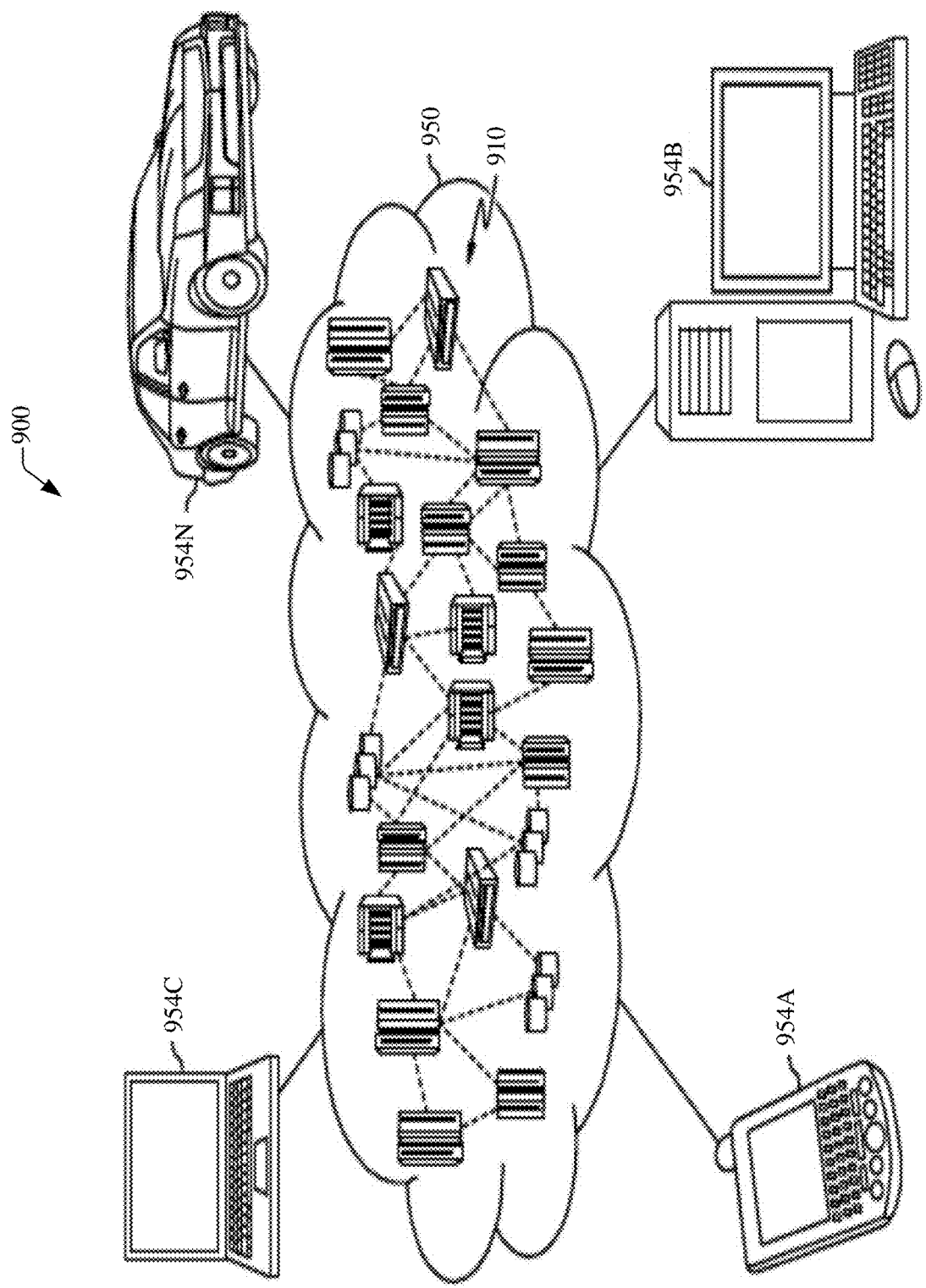
FIG. 9 is a block diagram of a non-limiting example of a cloud computing environment in accordance with one or more embodiments described herein.

In some embodiments, the various embodiments of compiler system 110 described herein can be associated with a cloud computing environment. For example, the compiler system 110 can be associated with cloud computing environment 950 as is illustrated in FIG. 9 and/or one or more functional abstraction layers described herein with reference to FIG. 10 (e.g., hardware and software layer 1060, virtualization layer 1070, management layer 1080, and/or workloads layer 1090).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9 an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
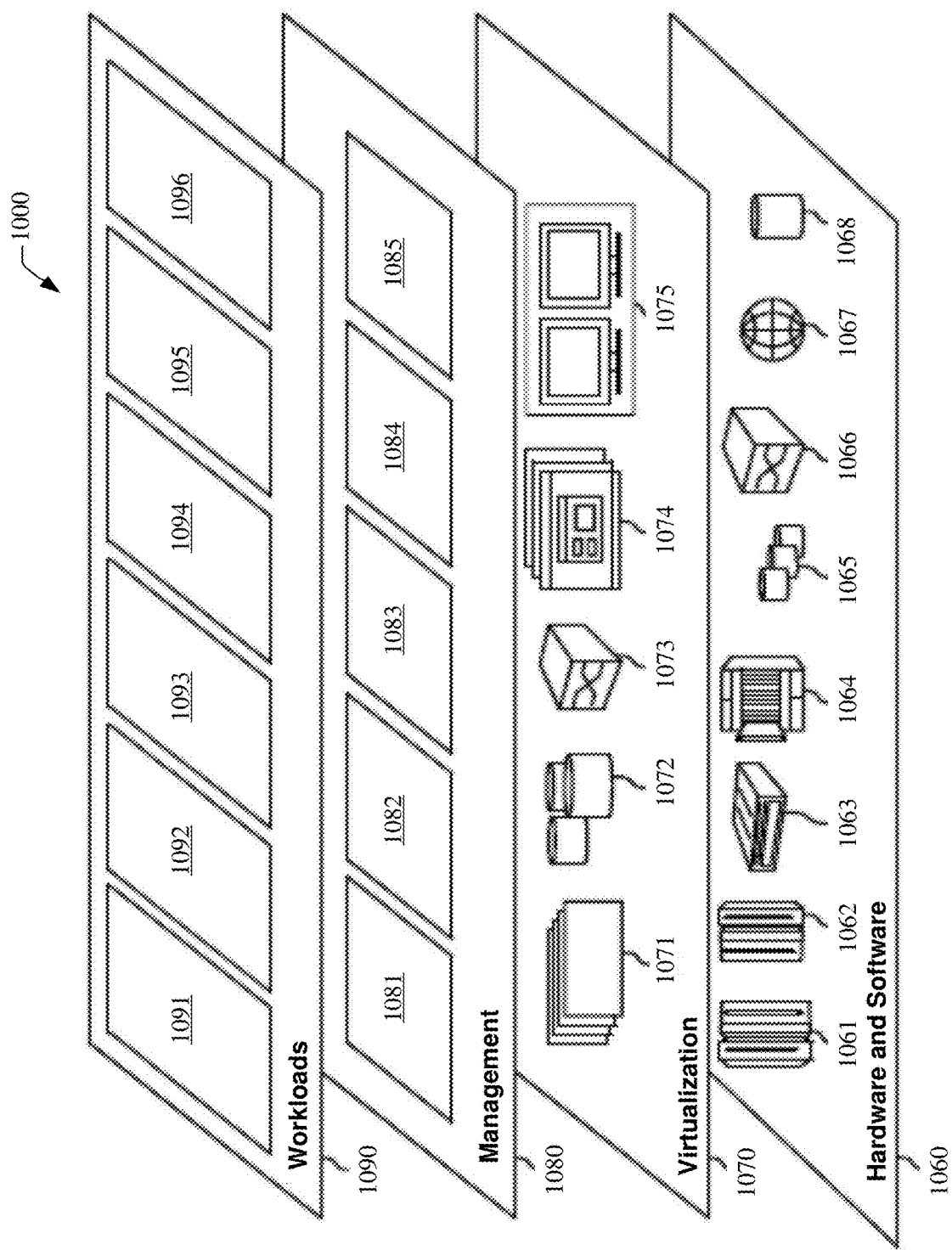
FIG. 10 is a block diagram of a non-limiting example of abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 include hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and vulnerability risk assessment software 1096.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," data storage," "database," "repository," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor:
   a memory, coupled to the processor, that stores executable instructions that, when executed by the processor, cause the processor to:
   compile a quantum program comprising a set of quantum circuits, wherein the compiling of the quantum program comprises:
   identifying, in a first commutation directed acyclic graph (DAG) representing a first quantum circuit of the quantum program and a second commutation DAG representing a second quantum circuit of the quantum program, a subgraph having an upper-bound size that is greater than a threshold size, wherein the subgraph represents a quantum subcircuit that is included in the first commutation DAG represents a first quantum circuit and the second quantum circuit;
   compiling the quantum subcircuit;
   replacing the quantum subcircuit in the first quantum circuit of the quantum program with the compiled quantum subcircuit;
   replacing the quantum subcircuit in the second quantum circuit of the quantum program with the compiled quantum subcircuit; and
   compiling the first quantum circuit and the second quantum circuit that respectively comprise the compiled quantum subcircuit.

2. The system of claim 1, wherein the compiling the quantum program further comprises:
   replacing the quantum subcircuit in a third commutation DAG representing a third quantum circuit of the quantum program with the compiled quantum subcircuit; and
   compiling the third quantum circuit that comprises the compiled quantum subcircuit.

3. The system of claim 1, wherein the first commutation DAG comprises vertices that represent gates of the first quantum circuit, and wherein a first vertex representing a first gate of the gates and a second vertex representing a second gate that have dependency and do not commute are connected with an edge.

4. The system of claim 1, wherein the identifying the subgraph comprises identifying a set of vertices and a set of edges in a defined graph basis for the first commutation DAG and the second commutation DAG, wherein an arrangement of the set of vertices and the set of edges in the first commutation DAG matches a second arrangement of the set of vertices and the set of edges in and the second commutation DAG.

5. The system of claim 1, wherein the identifying further comprises determining the upper-bound size of the subgraph by evaluating a lower-bound function for maximum common subgraph (MCS) for nodes in one or more candidate common subgraphs among the first commutation DAG and the second commutation DAG.

6. The system of claim 5, wherein the compiling the quantum subcircuit comprises modifying the quantum subcircuit by solving an optimization problem with respect to a performance function based on a layout of a set of gates of the quantum subcircuit and one or more physical properties of a quantum computer that executes the set of quantum circuits.

7. The system of claim 1, wherein the set of quantum circuits comprises a group of quantum circuits representing a variational quantum algorithm.

8. A computer-implemented method, comprising:
compiling, by a system operatively coupled to a processor, a quantum program comprising a set of quantum circuits, wherein the compiling of the quantum program comprises:
identifying, in a first commutation directed acyclic graph (DAG) representing a first quantum circuit of the quantum program and a second commutation DAG representing a second quantum circuit of the quantum program, a subgraph having an upper-bound size that is greater than a threshold size, wherein the subgraph represents a quantum subcircuit that is included in the a first quantum circuit and the second quantum circuit;
compiling the quantum subcircuit;
replacing, the quantum subcircuit in the first quantum circuit of the quantum program with the compiled quantum subcircuit;
replacing the quantum subcircuit in the second quantum circuit of the quantum program with the compiled quantum subcircuit; and
compiling the first quantum circuit and the second quantum circuit that respectively comprise the compiled quantum subcircuit.

9. The computer-implemented method of claim 8, wherein the compiling the quantum further comprises:
replacing the quantum subcircuit in a third commutation DAG representing a third quantum circuit of the quantum program with the compiled quantum subcircuit; and
compiling the third quantum circuit that comprises the compiled quantum subcircuit.

10. The computer-implemented method of claim 8, wherein the compiling the quantum subcircuit comprises modifying the quantum subcircuit by solving an optimization problem with respect to a performance function based on a layout of a set of gates of the quantum subcircuit and one or more physical properties of a quantum computer that executes the set of quantum circuits.

11. The computer-implemented method of claim 8, wherein the identifying the subgraph comprises determining the upper-bound size of the subgraph by evaluating a lower-bound function for maximum common subgraph (MCS) for nodes in one or more candidate common subgraphs among the first commutation DAG and the second commutation DAG.

12. The computer-implemented method of claim 8, wherein the identifying the subgraph comprises identifying a set of vertices and a set of edges in a defined graph basis for the first commutation DAG and the second commutation DAG, wherein an arrangement of the set of vertices and the set of edges in the first commutation DAG matches a second arrangement of the set of vertices and the set of edges in and the second commutation DAG.

13. The computer-implemented method of claim 8, wherein the identifying the subgraph comprises selecting a largest subgraph that is common among the first commutation DAG and the second commutation DAG.

14. The computer-implemented method of claim 8, further comprising receiving a parameter defining the threshold size before the identifying, wherein the parameter is an integer greater than 2.

15. The computer-implemented method of claim 10, wherein the quantum subcircuit is modified a single time during compilation of the set of quantum circuits.

16. A computer program product for compilation of a quantum program, the computer program product comprising a computer-readable storage medium having program instructions embodied therewith, the program instructions executable by a processor to cause the processor to:
compile, by the processor, the quantum program comprising a set of quantum circuits, wherein the compiling of the quantum program comprises:
identifying, in a first commutation directed acyclic graph (DAG) representing a first quantum circuit of the quantum program and a second commutation DAG representing a second quantum circuit of the quantum program, a subgraph having an upper-bound size that is greater than a threshold size, wherein the subgraph represents a quantum subcircuit that is included in the a first quantum circuit and the second quantum circuit;
compiling the quantum subcircuit;
replace the quantum subcircuit in the first quantum circuit of the quantum program with the compiled quantum subcircuit;
replacing the quantum subcircuit in the second quantum circuit of the quantum program with the compiled quantum subcircuit; and
compiling the first quantum circuit and the second quantum circuit that respectively comprise the compiled quantum subcircuit.

17. The computer program product of claim 16, wherein the program instructions are further executable by the processor to cause the processor to:
replace the quantum subcircuit in the second a third commutation DAG representing a third quantum circuit of the quantum program with the compiled quantum subcircuit; and
compiling the third quantum circuit that comprises the compiled quantum subcircuit.

18. The computer program product of claim 16, wherein compiling the quantum subcircuit comprises modifying the quantum subcircuit by solving an optimization problem with respect to a performance function based on a layout of a set of gates of the quantum subcircuit and one or more physical properties of a quantum computer that executes the set of quantum circuits.

19. The computer program product of claim 16, wherein identifying the subgraph comprises determining the upper-bound size of the subgraph by evaluating a lower-bound function maximum common subgraph (MCS) for nodes in one or more candidate common subgraphs among the first commutation DAG and the second commutation DAG.

20. The computer program product of claim 16, wherein identifying the subgraph comprises identifying a set of vertices and a set of edges in a defined graph basis for the first commutation DAG and the second commutation DAG, wherein an arrangement of the set of vertices and the set of edges in the first commutation DAG matches a second arrangement of the set of vertices and the set of edges in and the second commutation DAG.

* * * * *